May 21, 1946.　　　I. A. MORRIS　　　2,400,652
LANDING GEAR FOR TRAILERS AND THE LIKE
Filed Sept. 19, 1944　　　2 Sheets-Sheet 1
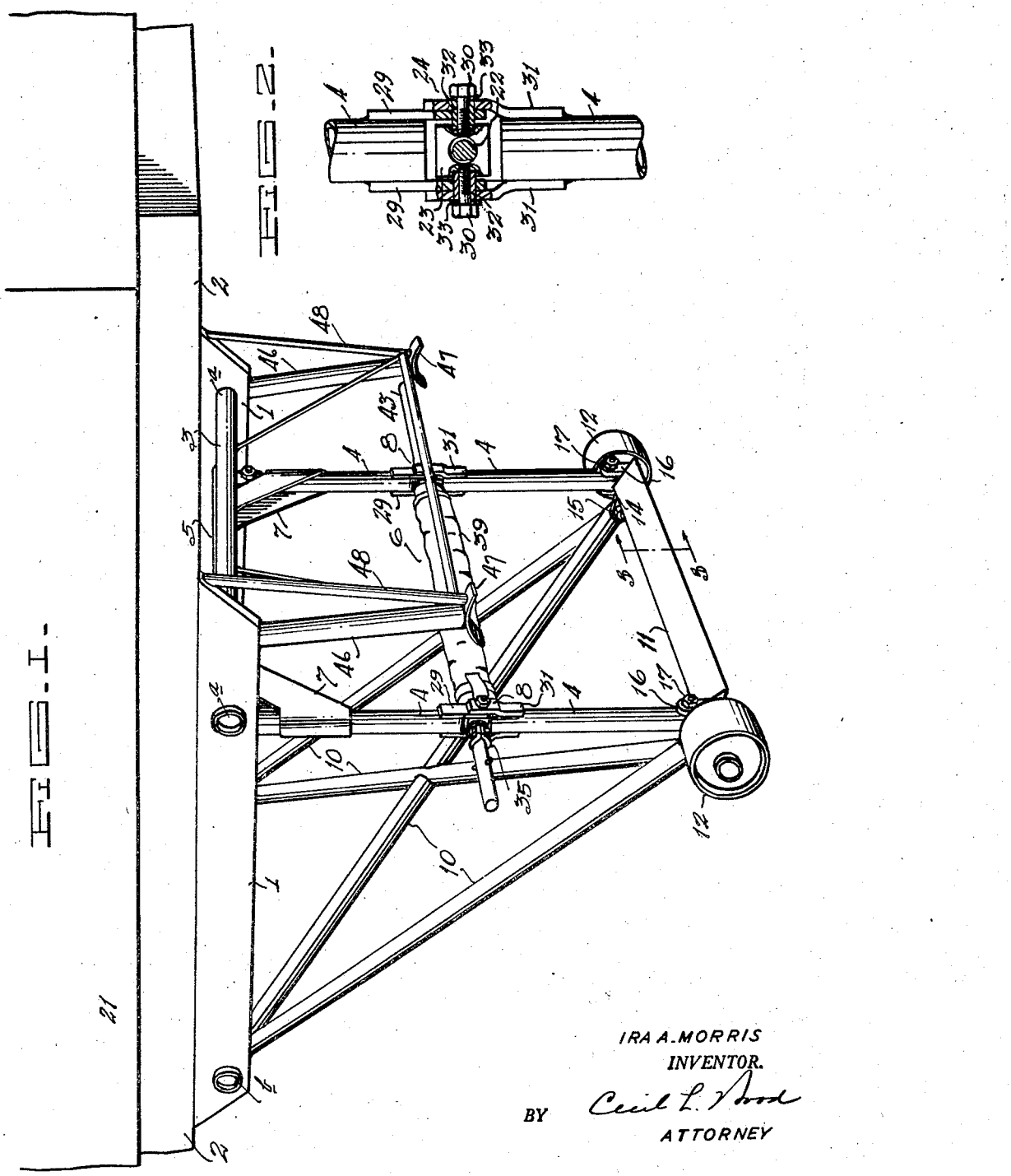
IRA A. MORRIS
INVENTOR.
BY Cecil L. Wood
ATTORNEY May 21, 1946.  I. A. MORRIS  2,400,652
LANDING GEAR FOR TRAILERS AND THE LIKE
Filed Sept. 19, 1944   2 Sheets-Sheet 2
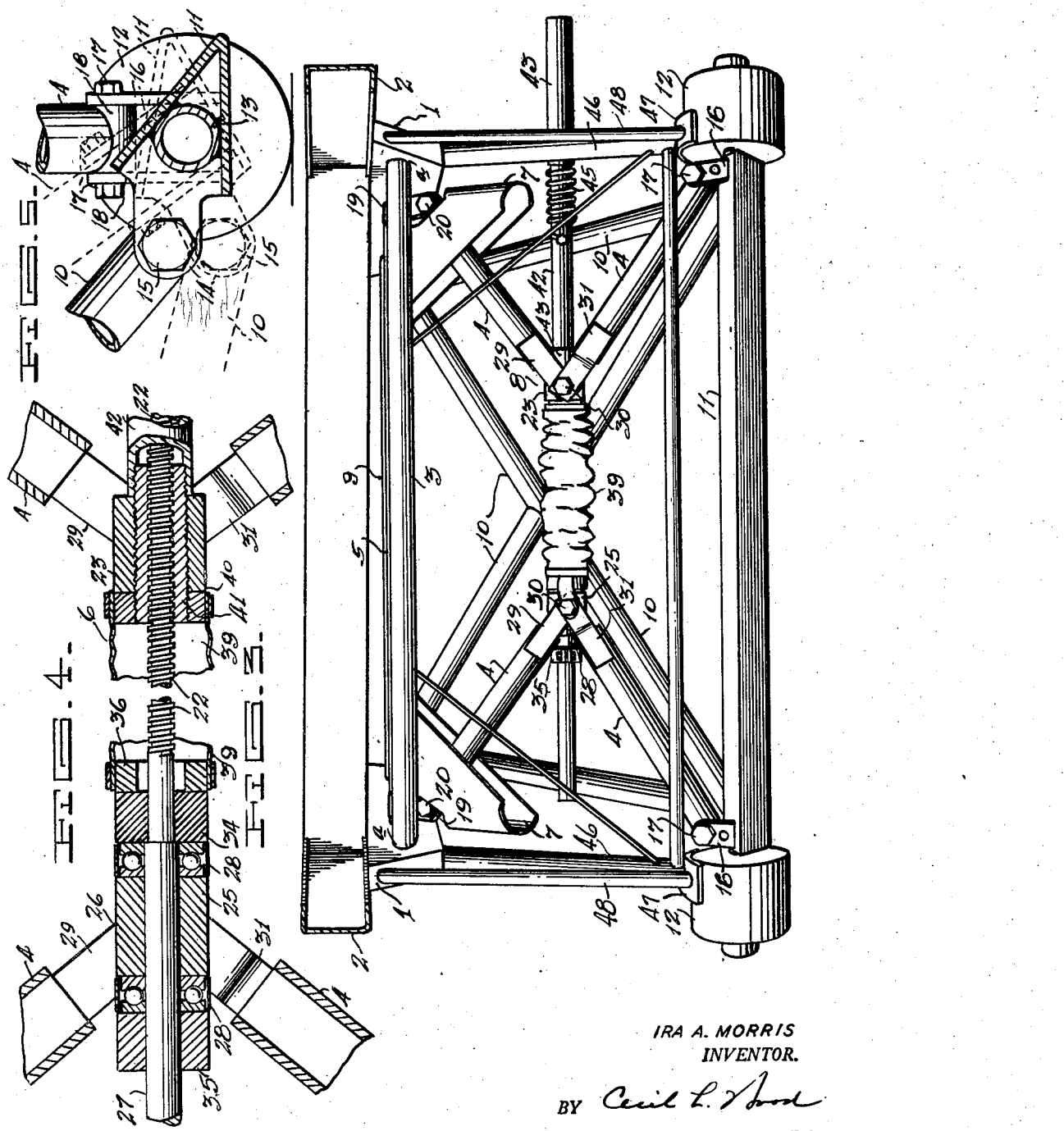
IRA A. MORRIS
INVENTOR.
BY
ATTORNEY Patented May 21, 1946

2,400,652

UNITED STATES PATENT OFFICE 2,400,652

LANDING GEAR FOR TRAILERS AND THE LIKE

Ira A. Morris, Fort Worth, Tex.

Application September 19, 1944, Serial No. 554,827

6 Claims. (Cl. 280—33.1)

This invention relates to landing gears for trailers, or the like, of the type operating on two wheels and adapted for connection to a tractor, and its primary object resides in the provision of a retractible landing gear capable of being extended and retracted by a simple screw assembly by which the supporting legs are collapsibly folded so that the complete supporting structure can be compactly arranged beneath the trailer in transit.

Another object of the invention resides in the provision of a landing gear having a liberal bearing surface at the ground surface and afford means for preventing the vehicle from being mired in soft earth where the rollers provided are not sufficient in bearing surface to properly support the load.

Yet another object of the invention resides in the provision of a compact though sturdy structure suitably supporting the vehicle under any load on any type of ground surface where the trailer can be employed.

An important object of the invention resides in the provision of a crash landing assembly which is incorporated into the invention and which is designed to prevent serious injury to the equipment or load and prevent public damage along public highways, and the like, in the event the trailer, to which the invention is applied, becomes disconnected from the tractor in transit.

Broadly, the invention seeks to comprehend the provision of a landing gear which can be readily secured to any type of two wheel trailer and which may be easily operated by one person to lower or raise the same thus affording an arrangement by which the heaviest trailers can be handled with a minimum of effort, as well as to provide a safety crash feature to prevent serious injury to the trailer and load in the event the same should become detached from the tractor.

While the foregoing objects are paramount, other and lesser objects will become manifest as the description proceeds taken in connection with the appended drawings wherein:

Figure 1 is a perspective illustration of the invention shown attached to a trailer which is fragmentarily shown.

Figure 2 is a fragmentary illustration of the hinged joint of one of the collapsible legs, showing portions cut away to illustrate the manner in which the threaded block is supported in the joint.

Figure 3 is a front perspective view of the invention in retracted position and shown attached to a trailer frame.

Figure 4 is a longitudinal cross-sectional illustration of the screw assembly by which the collapsible legs are operated, and Figure 5 is a fragmentary view of one end of the roller and shoe assembly taken on lines 5—5 of Figure 1.

The invention consists primarily, of a pair of parallel frame members 1 which are of suitable dimensions to insure the proper strength and durability and spaced to conform to the longitudinal frame members 2 of the trailer to which the invention is applied. Cross members 3 properly brace the frame structure.

A pair of legs 4 are pivotally connected to a transversely arranged rod or pipe 5 pivotally supported at each end at $a$ in each of the frame members 1, as shown in Figures 1 and 3. Thus the legs 4 will incline forwardly of the frame, as well as break inwardly, as the screw assembly 6 is operated to retract the gear. A pair of stops, or gussets 7 are rigidly attached to the cross member 5 to prevent the legs 4 from breaking outwardly at the hinged joint 8 and, by reason of their rigid connection with the pivoting member 5, the gussets 7 are always in alinement with the upper sections of the legs 4.

Rearwardly of the invention is arranged another pivoted cross member consisting of a rod or pipe 9 which is journaled at each end at $b$ in each of the frame members 1 and to which is rigidly attached a frame 10 which normally, in operation, inclines downwardly and forwardly of the assembly, as in Figure 1, and has a pivotal connection with a shoe 11 arranged transversely of the frame. A pair of rollers 12 are arranged on a hollow 13, at each end of the shoe 11 in a manner illustrated in Figure 5.

The lower forward end of the frame 10 is pivotally connected at each end of the shoe 11 by an integral plate 14 through the medium of bolts 15. In Figure 5 is shown, in dotted lines, the manner of operation of this arrangement illustrating the positions of the shoe 11, the frame 10 and plates 14 when the gear is extended and retracted, the dotted lines indicating the position of the parts when the gear is retracted. In this view is also shown the operative and inoperative positions of the legs 4 which are pivotally connected, at their lowermost ends, to the shaft 13 by straps 16, preferably welded to each side of the shaft 13, through which bolts 17 are arranged and extend through ferrules 18 welded or otherwise attached to the lower ends of the legs 4.

The upper ends of the legs 4 are likewise pivotally connected to the cross member 5 and a similar arrangement of straps 19 and bolts 20 are provided to afford proper flexibility.

Figure 1 shows the legs 4 in rigid upright position supporting the trailer 21 fragmentarily illustrated. The legs 4 are thus fully extended, the gussets 7 retaining them in upright position on each side of the structure while the screw 22 of the screw assembly 6 supports them inside the structure. A crank (not shown) is arranged upon the operative end of the screw 22, shown in detail in Figure 4, and the latter is rotated to cause the interiorly threaded block 23 to move along the screw 22 urging the legs apart.

The block 23 is arranged in the hinged joint 24, shown in detail in Figure 2, while another block 25 is similarly arranged in the opposite joint 26 although the block 25 is not interiorly threaded but acts only as a bearing for the operated end 27 of the screw 22, as illustrated in Figure 4, which at this point is in the form of a shaft. A thrust bearing 28 is arranged on each side of the block 25.

The preferred form of the hinged joints 24 and 26 of the legs 4 is shown in Figure 2 and comprises a pair of straps 29 arranged on and preferably welded to each side of the upper sections of each of the legs 4 and extending downwardly where their apertured lower ends are pivotally connected by cap screws 30 to similar straps 31 integral with the upper ends of the lower sections of the legs 4. It is desirable to provide ferrules 32 for the cap screws or bolts 30 to prevent binding of the joint when the latter are tightened. The inner ends of the screws 30 are threaded into each side of the interiorly threaded block 23 and serve to horizontally pivot the legs 4 at the joints 24 and 26, and although the block 25 is not interiorly threaded, this member is similarly supported in the joint 26, as shown in Figure 1.

The ferrules 30, as will become apparent by reference to Figure 2, extend through both of the straps 29 and 31 on each side of the leg assembly and into the block 23, and thus provide bearings for the joints and insure free movement thereof although the bolts 30 are threaded tightly into the block 23, the latter operating in a horizontal plane at all times and in alignment with the screw 22. A washer 33 is also provided on each of the bolts 30 to afford further bearings.

The bearings 28 are retained in position on the shaft 27 on each side of the block 25 by a split collar 34, on the inside and on the outside by another split collar 35. A ring 36 is arranged adjacent to the collar 34 to which one end of a flexible cover 39 is secured to protect the screw 22, the opposite end of the cover being secured to an interiorly threaded collar 40 threaded upon the inner end of an interiorly and exteriorly threaded bushing in the block 23. Clamps 40 are arranged over the ends of the cover 39 on the rings 36 and 40 to retain the same. A tube 42 is threaded upon the opposite end of the bushing 41 on the opposite side of the block 23 and extends outwardly concentrically around the screw 22 and protects the same from dirt and grit. An extensible tubular housing 43 is slidably arranged over the outer end of the tube 42, as shown in Figure 3, and is retained by a spring 45 arranged upon the tube 42 to retract the housing 43 as the screw 22 is withdrawn in lowering the gear.

In order to prevent serious injury to the trailer and its load, a crash landing device is provided which is designed to strengthen the gear so that if the trailer, for some reason, becomes detached from the tractor in transit, much of the shock can be absorbed and thus minimize the injury to the equipment and load. Integral with the forward ends of the frame members 1, therefore, are substantially vertical standards 46 each having an arcuately formed shoe 47 integrally attached to its lowermost end. The arcuate shoes 47 conform to the contour of the rollers 12 and are adapted to rest thereon, as in Figure 3, when the trailer is in transit. These shoes also serve to brake the rollers 12 in a crash landing and stop the trailer. The shoes 11 also, when in the position shown in dotted lines in Figure 5, provide a means for digging into the roadway to deter the movement of the freed trailer. Additional braces 48 are provided which are also integral with the shoes 47 and with the tips of the members 1.

Manifestly certain changes and modifications may be resorted to from time to time without departing from the spirit and intent of the invention or the scope of the appended claims.

What is claimed is:

1. In a landing gear for trailers, and the like, in combination with a frame structure having a pair of parallel members adapted for rigid attachment to a frame of a trailer, a pair of leg members having pivotal connection with the said rigidly attached members each comprising hinged sections and having mechanical means thereon for lowering and retraction with respect to the ground surface, a pair of rollers and a ground engaging shoe separating the said rollers operatively arranged in the said pivotally connected frame structure and brake members engageable with the said rollers cooperating with the said shoe to retard the trailer in a crash landing.

2. In a landing gear for trailers, and the like, a pair of parallel members adapted for securement to a trailer frame, a retracting frame structure including a pair of hinged legs pivotally suspended from the said parallel members and a horizontal variable shoe extending between the said legs providing a supporting surface on the ground for the said trailer, a pair of rollers spaced by the said shoe and having their ground engaging surfaces on a slightly lower plane than the plane of the said shoe, means comprising a screw assembly attached to the said legs for retracting and lowering the said landing gear and brake members engageable with the said rollers to retard the said trailer in a crash landing.

3. In a landing gear for trailers, and the like, a retracting frame structure having a pair of hinged legs having rollers thereon adapted to be brought into contact with the ground when the said frame structure is lowered, a pair of parallel rigid members pivotally supporting the said frame structure and rigidly attached to the said trailer, safety means comprising brakes for the said rollers providing for a crash landing of the said trailers and a screw assembly for raising and lowering the said frame structure by exerting a force inwardly or outwardly on the said legs.

4. In a landing gear for trailers, in combination with a pivotally connected frame structure having a pair of parallel members for rigid attachment to a trailer frame, hinged collapsible standards forming parts of the said frame structure and having rollers operatively arranged on their lower ends, a screw assembly providing means for extending the said standards and retaining the same rigid for supporting the said trailer, and means comprising brake members engaging the said rollers and a shoe member for retarding the said trailer in a crash landing.

5. In a trailer landing gear, the combination with a frame structure comprising a pair of parallel members for rigid attachment to a trailer frame and pivotal members connected therewith, retractible supporting legs for the said trailer formed with hinged joints intermediate their ends and a screw assembly operatively arranged through the said hinged joints for exerting a force against the said legs in opposite directions to extend the same and provide a support for the said trailer an axle having wheels thereon rigidly secured to the lowermost ends of the said legs, the said axle having a shoe along its entire length for engaging the ground in an emergency and brake members engaging the said wheels in retracted position.

6. In a landing gear for trailers, the combination which comprises a pair of parallel frame members rigidly attached to a trailer frame, a pair of collapsible supporting legs pivotally attached to the said frame members and capable of being extended and retracted beneath the said trailer, a pair of rollers having a variable shoe arranged therebetween and capable of engaging the ground, a brake member engageable with each of the rollers in retracted position and a screw mechanism effecting the extension and retraction of the said supporting legs.

IRA A. MORRIS.